(No Model.) 2 Sheets—Sheet 2.
A. CORBIN, Jr.
POTATO DIGGER.
No. 319,793. Patented June 9, 1885.
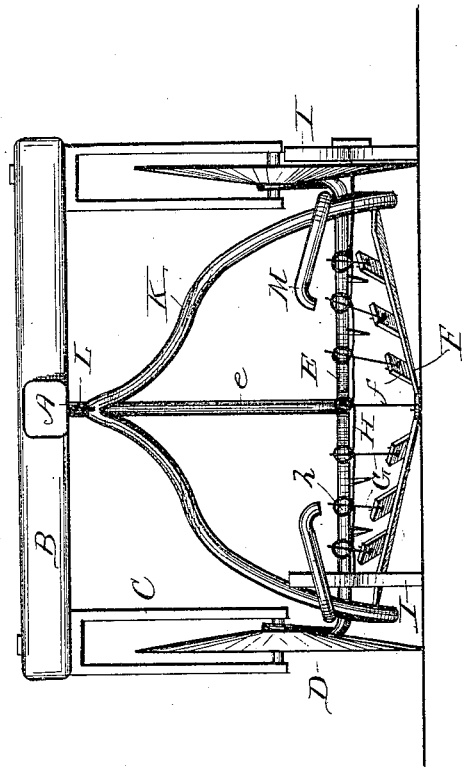

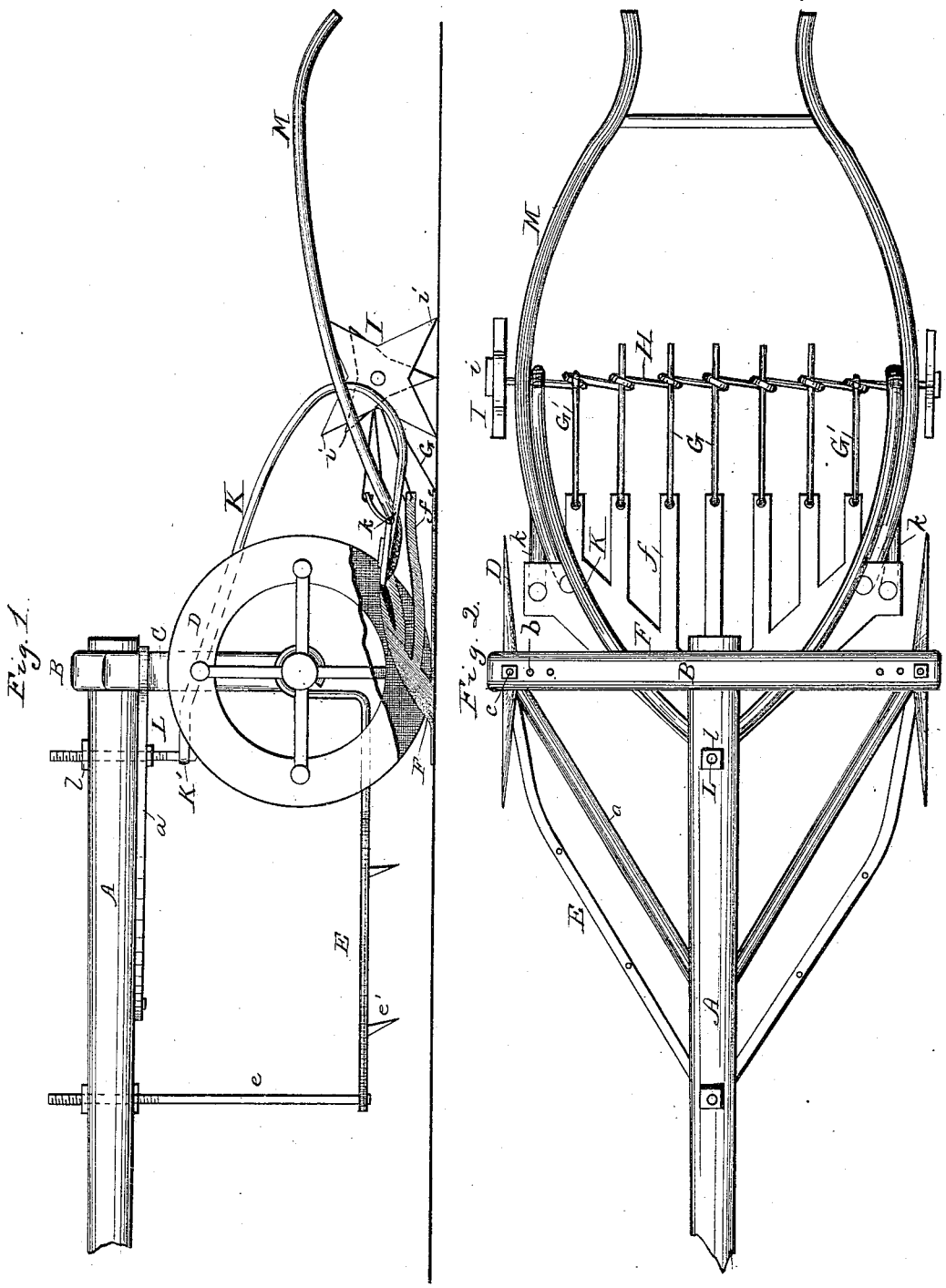

UNITED STATES PATENT OFFICE.

AMASA CORBIN, JR., OF GOUVERNEUR, NEW YORK.

POTATO-DIGGER.

SPECIFICATION forming part of Letters Patent No. 319,793, dated June 9, 1885.

Application filed March 24, 1885. (No model.)

*To all whom it may concern:*

Be it known that I, AMASA CORBIN, Jr., a citizen of the United States, residing at Gouverneur, in the county of St. Lawrence and State of New York, have invented certain new and useful Improvements in Potato-Diggers, of which the following is a specification, reference being had therein to the accompanying drawings.

Figure 1 is a side elevation of a potato-digger embodying my improvements. Fig. 2 is a top plan view of the same. Fig. 3 is a rear elevation.

In the drawings, A represents the tongue or pole, upon the rear end of which is mounted a cross-bar, B, these two parts being braced by stay-rods a, and together forming the draft-frame of the machine, upon which the various parts are mounted.

C C are downward-extending standards, supporting in their lower ends revolving disks D. In order to permit the disks to be adjusted toward and from each other, the cross-bar is provided near each end with a series of apertures, b, through which project screw-threaded shanks c, carried by the standards C. It will be seen that the disks may be placed nearer together or farther apart by shifting the shanks of the standards from one aperture b to the other, and also that the disks can be inclined or turned so that either the convex or concave face shall be outward, these various adjustments being required to do satisfactory work.

E is a harrow, preferably of V shape, adapted to travel in front of the disks. It is supported at its front end by an adjusting-rod, e, which is connected to the tongue, and at the rear end it is attached to any preferred part of the machine, I having shown it in Fig. 1 as connected to the standards carrying the cutting-disks. This harrow operates to tear up the vines and weeds which lie in the path of the machine, and deliver them to the sides, where they may be covered by the soil turned over by the disks D, the harrow being so arranged that the rear ends of the the teeth-carrying bars shall lie in front of the disks.

e' are teeth carried by the harrow, they being inclined rearward to facilitate their freeing themselves of the vines as the machine advances.

F is a shovel or plow lying behind and a little in rear of the disks, and adapted to dig the potatoes and bring them to the surface of the ground. The central portion of the plow is lower than the outer edges, thus insuring that the potatoes in the central part of the hill, where they grow the deepest, shall all be dug without requiring the raising of an unnecessarily large amount of earth, and also tending to keep the potatoes together in a mass on the central part of the plow and preventing their working out at the sides.

The rear part of the plow or digger consists of backward-extending fingers or bars $f$, rounded upon their upper sides and adapted to allow the loose and smaller lumps of earth to pass through to the ground, while retaining the potatoes. In rear of the fingers $f$, I have shown a shaking grate or sifter adapted to complete the separation of all earth from the potatoes. It consists of a series of rods, G, loosely connected at their front ends to the fingers $f$, and passing through eyes or apertures $h$ in a bar, H, extending transversely across the track of the machine and supported at its ends upon star-wheels I, which travel over the ground and impart a shaking motion to the bar H and the rods G forming the sifting-grate. I have shown bar H as consisting of heavy wire looped to form eyes $h$, in which lie loosely the rods G.

It will be readily understood that in place of employing a metallic bar, H, as shown, I may use one formed of wood or other material, it being provided with apertures for the passage of the rods G. The outer rods, G', of the series are securely though loosely connected with the bar H, as well as to the fingers $f$, it being through these two bars that power is imparted from the draft frame to the bar H, in order to cause it to follow the machine and the wheels I to travel over the ground. The two agitating star-wheels I, upon opposite sides of the machine, are provided with a different number of points, $i$, one being shown as having three points and the other with four, this arrangement causing the shifting grate to have an irregular motion, the two sides being elevated and let fall at different times. This I have found desirable, as the mass of earth and potatoes carried upon the shaker is thereby more thoroughly separated than it would be were the number of points upon the two wheels the same and the ends of the bar H simultaneously lifted and let fall.

K is the standard by means of which the plow is attached to the main frame. It is of practically U shape, the central doubled forwardly-projecting portion, K', being adjustably attached to the pole near its rear end. From this point the legs of the standard diverge toward the sides of the plow, each extending downwardly and rearwardly to points in rear of the plow, where they again bend and form substantially horizontal forwardly-projecting parts $k$, which are attached to the sides or wings of the plow.

The peculiar bending of the legs of the standard shown in the drawings enables me to mount the plow or digger in rear of the tongue, and also causes them to lie in position to be intersected by the handles M, to which they may be attached. It will be seen that the downward-projecting parts $k$ of the standards lie upon the sides of the machine, and hence are not liable to catch and drag the vines which grow from the central part of the hill or row should the harrow E fail to pull them.

L is a rod or bolt passing through the pole, and adapted at its lower end to support the standard K. It is made vertically adjustable by means of the nuts $l$ upon the opposite sides of the pole, whereby the depth which the plow shall dig can be regulated to suit the work required.

M are the handles by means of which the plow or digger is held to its work and guided. When the disks are turned concave face out, they operate to turn over the soil and cover the weeds and vines delivered to the sides by the harrow E. When, however, they are reversed, the concave face being inside, they then operate to break up and pulverize the soil over the row of potatoes, thus relieving the plow of considerable work, this latter arrangement being employed when the ground is hard and inclined to be lumpy.

I do not wish to be limited to the combination of parts shown—that is, the use of the harrow, the disks, the digger, and the peculiarly-constructed shaker herein shown and described—as it will be readily understood that certain of these parts may be varied without departing from the spirit of my invention.

I am aware that an agitating device for a shaking screen of a potato-digger has been known, consisting of a shaft to the opposite ends of which were keyed two cam-wheels, each wheel having a longer and a shorter axis, the two wheels being so arranged upon their axle that their longer diameters were at right angles to each other.

I am also aware that it is old in potato-diggers to have a screen-shaking device consisting of a rotating shaft provided at its ends with star-wheels having equal numbers of points, which engage with the ground, and provided intermediately with pins, which engage with and agitate the screen. But my invention possesses advantages over both of such constructions, as by employing two agitating-wheels, each having a different number of points or projections, I insure that an irregular shaking motion shall be imparted to the screen at all times, even when the two wheels are mounted loosely upon their axle, as is necessary in the construction shown in the drawings, though it will be understood that agitating-wheels of the construction which I have shown may be rigidly secured to the axle.

What I claim is—

1. In a potato-digger, the combination of the draft-frame, a harrow adapted to tear up vines and weeds over the row and deliver them to the sides of the machine, the disks adapted to cover the material delivered by the harrow, and the plow or digger, substantially as set forth.

2. In a potato-digger, the combination of the draft-frame, the plow F, provided with rearward-extending fingers $f$, the shaking sifter in rear of the plow, consisting of the rods G, loosely connected at their forward ends to the fingers F, and the bar supporting the rear ends of the rods G, substantially as set forth.

3. In a potato-digger, the combination of the draft-frame, the plow F, the shaking sifter in rear of the plow, consisting of the rods G, loosely connected at their forward ends to the plow, the bar H, adapted to support the rear ends of rods G, and the rods G', connecting the plow and the bar H, substantially as set forth.

4. In a potato-digger, the combination of the main frame, the plow, the sifting-grate in rear of the plow, the agitating star-wheels I, upon opposite sides of the grate, and the axle upon which the said wheels are mounted, and which supports the rear part of the grate, each wheel I being provided with a different number of points, $i$, whereby an irregular shaking motion is imparted to the grate, substantially as set forth.

5. In a potato-digger, the combination of the main frame, the plow, the sifting-grate in rear of the plow, the agitating star-wheels upon opposite sides of the grate, and the bar H, looped to form eyes, $h$, in which lie the rods G, forming the grate, substantially as set forth.

In testimony whereof I affix my signature in presence of two witnesses.

AMASA CORBIN, JR.

Witnesses:
  E. H. NEARY,
  EARL BANCROFT.